United States Patent [19]
Khan et al.

[11] Patent Number: 6,064,788
[45] Date of Patent: May 16, 2000

[54] ADIABATIC Y-BRANCH MODULATOR WITH NEGLIGIBLE CHIRP

[75] Inventors: Mujibun Nisa Khan, Holmdel; Rene Henri Monnard, Old Bridge, both of N.J.

[73] Assignee: Lucent Technologies Inc., Murray Hill, N.J.

[21] Appl. No.: 08/911,197

[22] Filed: Aug. 14, 1997

[51] Int. Cl.$^7$ ............................................. G02B 6/10
[52] U.S. Cl. .................................. 385/45; 385/43; 385/4; 385/22
[58] Field of Search ................. 385/4, 5, 6, 7, 385/8, 9, 10, 22, 43, 45, 14

[56] References Cited

U.S. PATENT DOCUMENTS

| | | | |
|---|---|---|---|
| 4,753,505 | 6/1988 | Mikami et al. | 350/96.13 |
| 5,129,017 | 7/1992 | Kawano et al. | 385/3 |
| 5,333,231 | 7/1994 | Fukuda et al. | 385/122 |
| 5,408,544 | 4/1995 | Seino | 385/3 |
| 5,408,566 | 4/1995 | Eda et al. | 385/131 |
| 5,432,873 | 7/1995 | Hosoya et al. | 385/21 |
| 5,455,433 | 10/1995 | Komatsu | 257/95 |
| 5,461,684 | 10/1995 | Vinchant et al. | 385/22 |
| 5,481,636 | 1/1996 | Fukuda et al. | 385/4 |
| 5,594,818 | 1/1997 | Murphy | 385/8 |
| 5,617,493 | 4/1997 | Nishimoto | 385/40 |
| 5,712,935 | 1/1998 | Miyakawa | 385/22 |

OTHER PUBLICATIONS

J. F. Vinchant et al., "Low driving voltage of current digital optical switch on InP for multiwavelength system applications," *Electronics Letters*, 4 (Jun. 1992).

"Weighted–Coupling Y–Branch Optical Switch in InGaAs/InAaAlAs Quantum Well Electron Transfer Waveguides," Khan et al, IEEE Photonics Technology Letters, vol. 3, Mar. 1994, pp. 394–397.

"Design and Demonstration of Weighted–Coupling Digital Y–Branch Optical Switches in InGaAs/InGaAlAs Electron Transfer Waveguides," Khan et al, Journal of Lightwave Technology, vol. 12, No. 11, Nov. 1994, pp. 2032–2039.

"Digital Optical Switch," Silberberg et al, Appl. Phys. Lett. 51(16), Oct. 19, 1987, pp. 1230–1232.

"Shaping the Digital Switch," W. K. Burns, IEEE Photonics Technology Letters, vol. 4, No. 8, Aug. 1992, pp. 861–883.

*Primary Examiner*—Hung N. Ngo

[57] ABSTRACT

Methods of using an adiabatic Y-branch digital optical modulator provide a substantially chirp-free modulator by changing the refractive index of only a first output branch of the modulator in response to a modulating signal. A second output branch of the modulator, where no refractive index change is induced, is used as the modulator output. The frequency chirp in this Y-branch modulator is negligible because the modulator output waveguide branch experiences little or no refractive index change and, therefore, little or no phase shift in operation. Substantially all of the phase shift occurs in the waveguide branch where the refractive index change is induced. According to a further embodiment, one or both of the output branches are comprised of one or more tapered waveguide sections.

47 Claims, 1 Drawing Sheet

ADIABATIC Y-BRANCH MODULATOR WITH NEGLIGIBLE CHIRP

BACKGROUND OF THE INVENTION

1. Field of the Invention

The invention relates generally to optical communications and, more particularly, to optical modulators.

2. Description of the Related Art

There is presently a need to provide optical communication paths over relatively long distances on the order of hundreds, or even thousands, of kilometers. Providing such a long-haul communications path often proves challenging. The maximum distance at which optical communications are feasible, and the maximum signal bit rate, are limited by the frequency stability of the semiconductor laser used to generate an optical signal. If the optical signal exhibits frequency chirp, i.e., frequency shifts over time, the signal will be degraded as it traverses the length of a fiber optic cable. These degradations, which include chromatic dispersion and modal dispersion, become more pronounced as the length of cable is increased, and/or as the bit rates are increased, until, at some point, it is no longer possible to recover intelligible information from the optical signal. Therefore, there is a need to minimize frequency chirp in optical communications systems.

In optical communications systems, Y-branched waveguides have been employed to provide digital optical switching and optical signal modulation. A typical Y-branch digital optical switch is designed such that two waveguide branches intersect at a very small angle to form a Y-shaped structure. The composition of the waveguide structure may include any of a wide variety of materials, such as lithium niobate ($LiNbO_3$), and/or various semiconductor materials. One example of a Y-branch digital optical switch is described by M. N. Khan in the 1995 ECOC Proceedings, Vol. 1, pages 103–106. Another Y-branch switch is disclosed in U.S. Pat. No. 5,594,818, entitled, "Digital Optical Switch and Modulator and a Method for Digital Optical Switching and Modulation", issued on Jan. 14, 1997 to Edmond J. Murphy.

Most existing methods of operating optical signal modulators that use the Y-branch configuration change the refractive indices of both output waveguide branches. A modulated signal generated in this manner suffers from frequency chirp. In order to modulate an optical signal, the light propagation direction in one of the waveguide branches is changed by forcing a refractive index change in one of the branches with respect to the other branch. In the aforementioned Murphy patent, this is accomplished by imposing a biasing voltage across the two output waveguide branches. Therefore, the refractive indices in both waveguide branches will change in this instance. In an adiabatic Y-branch modulator, the direction of light propagation follows the waveguide branch having the highest refractive index. Note that, as used herein, the term adiabatic refers to processes involving continuous evolution as opposed to abrupt transitions.

Although many Y-branch modulators induce changes in the refractive indices of both waveguide branches by applying a voltage between the branches, it should be noted that such changes could also be induced by applying current and/or other external forces to selected sections of both waveguide branches. However, irrespective of the type of force that is used to induce refractive index changes, all existing proposed methods of controlling Y-branch modulators provide a modulated signal that exhibits frequency chirp.

SUMMARY OF THE INVENTION

Methods of using an adiabatic Y-branch digital optical modulator provide a substantially chirp-free modulator by changing the refractive index of only a first output branch of the modulator in response to a modulating signal. A second output branch of the modulator, where no refractive index change is induced, is used as the modulator output. The frequency chirp in this Y-branch modulator is negligible because the modulator output waveguide branch experiences little refractive index change and, therefore, little phase shift in operation. Substantial phase shift occurs in the waveguide branch where the refractive index change is induced.

DETAILED DESCRIPTION

Figure 1:
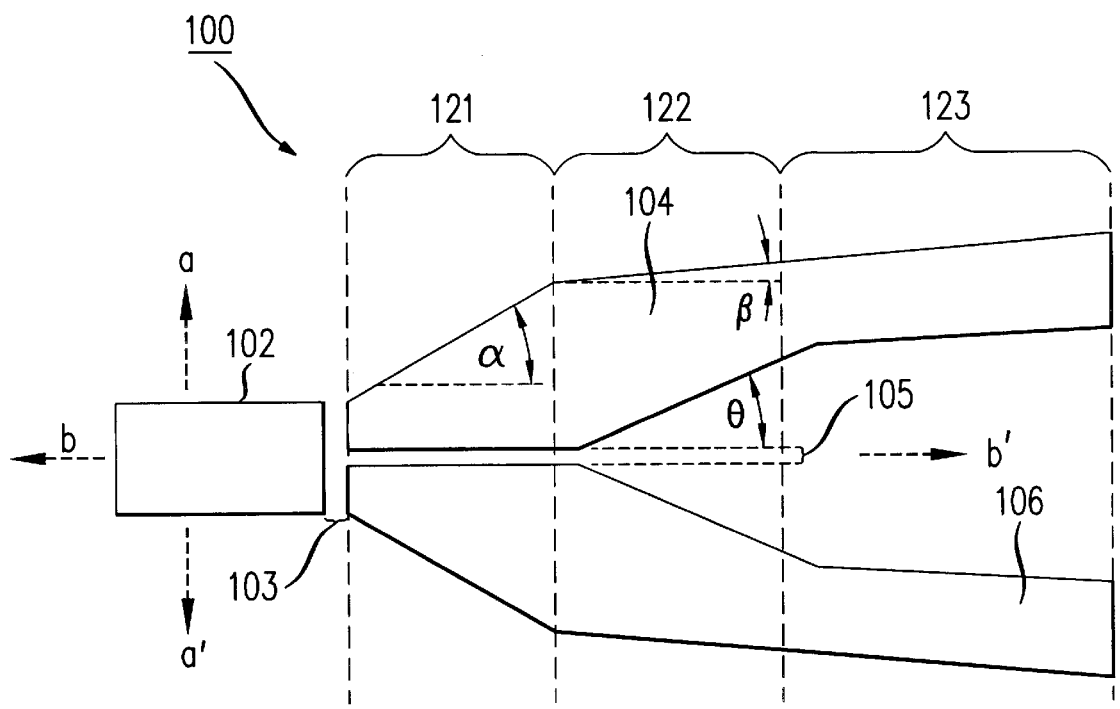
FIG. 1 is a top view of an illustrative adiabatic Y-branch optical waveguide modulator having three tapered waveguide sections according to a preferred embodiment of the invention.

Refer to FIG. 1, which is a top view of an illustrative adiabatic Y-branch optical waveguide modulator 100 that may be operated according to the principles disclosed herein to provide negligible frequency chirp. Although the structure of FIG. 1 is described as a "modulator", the principles disclosed herein are also applicable to optical switches. The embodiment shown in FIG. 1 may be constructed using semiconductor material such as Indium Phosphide. However, note that this adiabatic Y-branch modulator can be constructed using other materials as well. Although FIG. 1 shows a tapered adiabatic Y-branch structure, this is for illustrative purposes only, it being understood that the principles of the invention are applicable to virtually any type of optical switching or modulator structure with physical dimensions and configurations other than those shown in FIG. 1, so long as these structures use adiabatic modal evolution. The structure of FIG. 1 is constructed for electrical isolation in doped semiconductor waveguides where physical waveguide separations must be provided, shown as gaps 103 and 105. Waveguide devices where only electrically insulating materials and/or undoped semiconductor materials are used do not require gaps 103 and 105.

The Y-branch optical waveguide modulator 100 includes a first waveguide section 102, a second waveguide section 104, and a third waveguide section 106. First waveguide section 102 is fabricated to accept a single-mode optical input signal which can be adiabatically transformed to an appropriate switch and/or modulator output. In practice, the initial width of first waveguide section 102 along axis a–a', i.e., the end of first waveguide section 102 that is equipped to accept optical energy, may be approximately 3.0 micrometers. One end of the first waveguide section 102 is placed in close physical proximity to an end of the second waveguide section 104. This end of first waveguide section 102 is also placed in close physical proximity to an end of the third waveguide section 106, thereby providing a gap 103 between the first waveguide section 102 and each of the second and third waveguide sections 104, 106. The second waveguide section 104 is placed in close proximity to the third waveguide section 106 such that there is a gap 105 of about 0.75 micrometers between the second and third waveguide sections 104, 106. Note that a physical gap, i.e., gap 103, must be provided to electrically isolate first waveguide section 102 from second and third waveguide sections 104, 106 where doped semiconductor materials are used.

Second and third waveguide sections 104, 106 are both tapered in a manner so as to provide first and second tapered sections 121, 122, as well as a substantially untapered section 123. The use of tapered sections provides a Y-branch optical waveguide modulator 100 having a reduced length along axis b–b' relative to a similar waveguide modulator that does not use such tapered sections. This reduced length permits the modulator to be used in system applications where it is important or desirable to provide devices having compact dimensions. In many, if not all, cases, the use of tapered sections provides a length reduction of significant magnitude. Although FIG. 1 shows the use of tapered sections for both output branches, this is for purposes of illustration, as it is also possible to use tapered sections for either one of the two output branches, and to not use tapered sections for the remaining output branch.

Together, the tapered and untapered sections of optical waveguide modulator 100 form a first taper angle $\alpha$, a second taper outer angle $\beta$, and a second taper inner angle $\theta$. These taper angles $\alpha$, $\beta$, and $\theta$, may be defined with reference to axes which are parallel to propagational axis b–b', where propagational axis b–b' defines the direction of propagation through the first waveguide section 102. The angles are measured between an axis parallel to axis b–b' and a sidewall of a waveguide section. Inner angles are angles on the sidewall of second waveguide section 104 closest to third waveguide section 106, and also angles on the sidewall of third waveguide section 106 closest to second waveguide section 104. Outer angles are angles on the sidewall of second waveguide section 104 that is furthest from third waveguide section 106, and also angles on the sidewall of third waveguide section 106 that are furthest from second waveguide section 104. In the example of FIG. 1, the first taper angle $\alpha$ is selected to be about 0.9 degrees, the second taper outer angle $\beta$ is selected to be about 0.1 degrees, and the second taper inner angle $\theta$ is selected to be about 0.35 degrees. The length of the first tapered section 121 in a direction parallel to propagational axis b–b' is about 180 micrometers, the length of the second tapered section 122 in a direction parallel to propagational axis b–b' is about 200 micrometers, and the length of the untapered section 123 in a direction parallel to propagational axis b–b' is about 500 micrometers or more. The illustrative example of FIG. 1 is shown as being symmetrical about propagational axis b–b'. However, such symmetry is not required for obtaining negligible chirp from the unperturbed waveguide branch which is to be used as the proposed modulator output according to the methods disclosed herein.

First tapered section 121 of second waveguide section 104 is tapered such that the cross-sectional area of the waveguide increases with increased distance along a path defining the direction of optical propagation of the waveguide section. First tapered section 121 of third waveguide section 106 is also tapered such that the cross-sectional area of the waveguide increases with increased distance along a path defining the direction of optical propagation of the waveguide section. For purposes of characterizing waveguide taper, the cross sectional areas of the second and third waveguide sections 104, 106 may be taken along a plurality of planes that are substantially perpendicular to the direction of optical propagation. In this manner, as an optical beam traverses the first tapered section 121 of second waveguide section 104, the beam may be conceptualized as being dispersed over an ever-increasing area. Similarly, an optical beam traversing the first tapered section 121 of the third waveguide section 106 may be conceptualized as being dispersed over an ever-increasing area. In the example of FIG. 1, the first tapered section 121 of the second waveguide section 104 and the first tapered section 121 of the third waveguide section 106 are shown as symmetric for illustrative purposes only. Symmetric structures may, but need not, be used for the first tapered sections 121 of the second and third waveguide sections 104, 106. The first tapered sections 121 of the second and third waveguide sections 104, 106 may be conceptualized as representing a first, optically diverging, region of Y-branch optical waveguide modulator 100.

Second tapered section 122 of second waveguide section 104 is tapered such that the cross-sectional area of the waveguide decreases with increased distance along a path defining the direction of optical propagation of the waveguide section. Second tapered section 122 of third waveguide section 106 is also tapered such that the cross-sectional area of the waveguide decreases with increased distance along a path defining the direction of optical propagation of the waveguide section. The cross sectional areas of the second and third waveguide sections 104, 106 may be taken along a plurality of planes that are substantially perpendicular to the direction of optical propagation. In this manner, as an optical beam traverses the second tapered section 122 of second waveguide section 104, the beam will converge into an ever-decreasing area. Similarly, an optical beam traversing the second tapered section 122 of the third waveguide section 106 will be converged into an ever-decreasing area. In the example of FIG. 1, the second tapered section 122 of the second waveguide section 104 and the second tapered section 122 of the third waveguide section 106 are shown as symmetric for illustrative purposes only. Symmetric structures may, but need not, be used for the second tapered sections 122 of the second and third waveguide sections 104, 106. The second tapered sections 122 of the second and third waveguide sections 104, 106 may be conceptualized as representing a second, optically converging, region of Y-branch optical waveguide modulator 100.

Untapered section 123 of second waveguide section 104 is configured such that the cross-sectional area of the waveguide remains substantially unchanged with increased distance along a path defining the direction of optical propagation of the waveguide section. Untapered section 123 of third waveguide section 106 is also tapered such that the cross-sectional area of the waveguide remains substantially the same with increased distance along a path defining the direction of optical propagation of the waveguide section. The cross sectional areas of the second and third waveguide sections 104, 106 may be taken along a plurality of planes that are substantially perpendicular to the direction of optical propagation. In this manner, as an optical beam traverses the untapered section 123 of second waveguide section 104, the beam will neither substantially converge into an ever-decreasing are, nor substantially diverge into an ever-increasing area. Similarly, an optical beam traversing the untapered section 123 of the third waveguide section 106 will neither substantially converge into an ever-decreasing area, nor substantially diverge into an ever-increasing area In the example of FIG. 1, the untapered section 123 of the second waveguide section 104 and the untapered section 123 of the third waveguide section 106 are shown as symmetric for illustrative purposes only. Symmetric structures may, but need not, be used for the untapered sections 123 of the second and third waveguide sections 104, 106. The untapered sections 123 of the second and third waveguide sections 104, 106 may be conceptualized as representing a third region of Y-branch optical waveguide modulator 100.

The physical configuration of optical modulator 100 represents a significant improvement, in terms of excess loss, extinction ratio, and shorter length, over prior art designs. Due to the fact that the Y-branch optical structure of FIG. 1 utilizes principles of adiabatic modal evolution, existing Y-branch switches are undesirably lengthy as measured along propagational axis b–b'. This length was required in order to maintain a relatively small angle (less than about 0.1 degree) between the first waveguide section 102 and each of the second and third waveguide sections 104, 106 in order to maintain adiabatic modal evolution. This small angle provides a structure having low loss and low crosstalk which increases the extinction ratio of the modulator 100. Such crosstalk occurs between the second and third waveguide sections 104, 106. The first, second, and third tapered sections 121, 122, 123 of optical modulator 100 are adiabatically tapered provide a vastly improved structure which need only be about 800 micrometers long to provide adequate crosstalk and minimal attenuation.

The first, second, and third waveguide sections 102, 104, 106 may be fabricated using an 0.6-micrometer active layer of InGaAsP (Indium Gallium Arsenide Phosphide), clad with an 1.0-micrometer layer of InP (Indium Phosphide) cladding. The etch depth may be approximately 1.2 micrometers; however, physical dimensions other than those described also fall within the scope of the invention. The use of the aforementioned materials provides an optical modulator which can operate at speeds of up to 20 Gb/second, because of the relatively short length of the device and the relatively high index change that can be achieved with moderate modulating voltage/current levels.

It is understood that, while the material system of InGaAsP/InP is described above for fabricating optical waveguide modulator 100, other material combinations may be selected from other semiconductor Group III-V materials such as GaAs/AlGaAs, InGaAs/InAlAs, GaAs/AlAs, GaAsSb/GaAlAsSb, and GaAs/InGa AlAs. In these semiconductor systems, the layers may be lattice-matched to suitable GaAs or InP substrates. Mismatching is also contemplated wherein strained layers are grown over the substrate material. Finally, extension of the device structures is also contemplated to semiconductor compounds in Group II-VI and Group IV.

The operation of optical waveguide modulator 100 is governed by the principle of adiabatic modal evolution. Optical energy to which modulation is to be applied is fed into first waveguide section 102. The waveguide modulator 100 has an "on" state and an "off" state. To achieve the optical "on" state, this optical energy is adiabatically directed to a modulator output port, for example, waveguide section 104 by lowering the refractive index in waveguide section 106. To achieve the optical "off" state, the refractive index in waveguide section 106 is raised until the optical energy is coupled from waveguide sections 102 and 104 into waveguide section 106. However, the refractive index in waveguide section 104 is not modified.

First waveguide section 102 is configured to support a fundamental mode of electromagnetic wave propagation. Second and third waveguide sections 104, 106 are also configured so as to support a fundamental mode of propagation. If the second and third waveguide sections 104, 106 are so configured, the propagating mode of the optical energy in first waveguide section 102 adiabatically evolves to the fundamental mode of the second and third waveguide sections 104, 106. The optical field distribution of the fundamental mode as the mode propagates in the second and third waveguide sections 104, 106 depends upon the refractive index variation of these waveguide sections. By increasing the refractive index of one of these waveguide sections (e.g., second waveguide section 104) with respect to the other waveguide section (e.g., third waveguide section 106), an optical signal from first waveguide section 102 can be almost completely guided into the second waveguide section 104. Similarly, by decreasing the refractive index of one of these waveguide sections (e.g, second waveguide section 104) with respect to the other waveguide section (e.g, waveguide section 106), an optical signal from the first waveguide section can be almost completely guided into the other waveguide section, i.e., third waveguide section 106.

Various techniques can be used to change the refractive index of only one waveguide section. For example, the refractive index of one of the waveguide sections can be changed by applying some type of force to the waveguide, such as a mechanical force, a chemical force, and/or an electrical force. Examples of electrical forces are current and/or voltage. In cases where semiconductor materials such as, for example, InGaAsP and InP, are employed to fabricate the waveguide sections of FIG. 1, a convenient technique for changing the refractive index of a waveguide section is by applying and/or changing a bias voltage and/or current applied to that waveguide section. However, the principles of the invention disclosed herein are applicable to all adiabatic optical modulators, irrespective of the type of force that is used to change the refractive index of a waveguide section.

The Y-branch digital optical modulator shown in FIG. 1 and operated according to the principles of the invention disclosed herein may advantageously be employed in the operational environment of wavelength-division-multiplexed (WDM) systems. WDM systems represent an area within optical communications that has gained enormous interest in recent times. WDM systems utilize a plurality of modulated signals which are transmitted over the same optical fiber using different optical frequencies (or wavelengths). Prior-art WDM systems use different lasers as optical sources at different optical frequencies. These lasers are individually modulated and then combined into one fiber. When operated in accordance with the principles of the present invention, the configuration of FIG. 1 provides a wavelength-insensitive and virtually chirp-free modulator for many lasers of different frequencies. Such a modulator may be integrated with all of the lasers or, alternatively, could be a stand-alone modulator to simplify the manufacturing process.

One existing approach to minimizing the frequency chirp of a semiconductor laser uses a continuous-wave laser and an external modulator. One implementation of this approach uses a semiconductor laser and an external LiNbO$_3$ Mach-Zehnder modulator. This approach is somewhat expensive, and the resulting laser/modulator occupies an area that is undesirably large for certain system applications. Although this approach is currently used for very long distances, i.e., long-haul transoceanic systems, many long-haul terrestrial systems currently use semiconductor lasers that are monolithically integrated with external semiconductor modulators. These integrated devices exhibit an undesirable amount of chirp, and therefore, the application of these devices are limited to shorter distances compared to the "discrete" laser modulator configuration used, for example, in transoceanic systems. Furthermore, the current integrated laser-modulator device uses a semiconductor electro-absorption modulator that inherently exhibits an undesirable amount of frequency chirp. The chirp in this type of modulator is caused by the refractive index change that is induced when the modulator is biased with an external voltage for modulating the optical signal going through it.

The device of FIG. 1 with its three tapered sections can be advantageously employed as a laser modulator that provides little or no frequency chirp, occupies a relatively small amount of space, and may be relatively inexpensive to manufacture. To this end, note that presently-existing external modulators that are used in long-haul systems are fabricated using $LiNbO_3$ material. These prior art designs utilize a Mach-Zehnder configuration which is expensive and presents difficult size requirements for certain system applications. However, until now, use of the Mach-Zehnder configuration has been virtually mandated where zero chirp, or controllable chirp, needed to be provided in very long-haul communications. The modulator of FIG. 1 can be used in place of the Mach-Zehnder devices.

Figure 2:
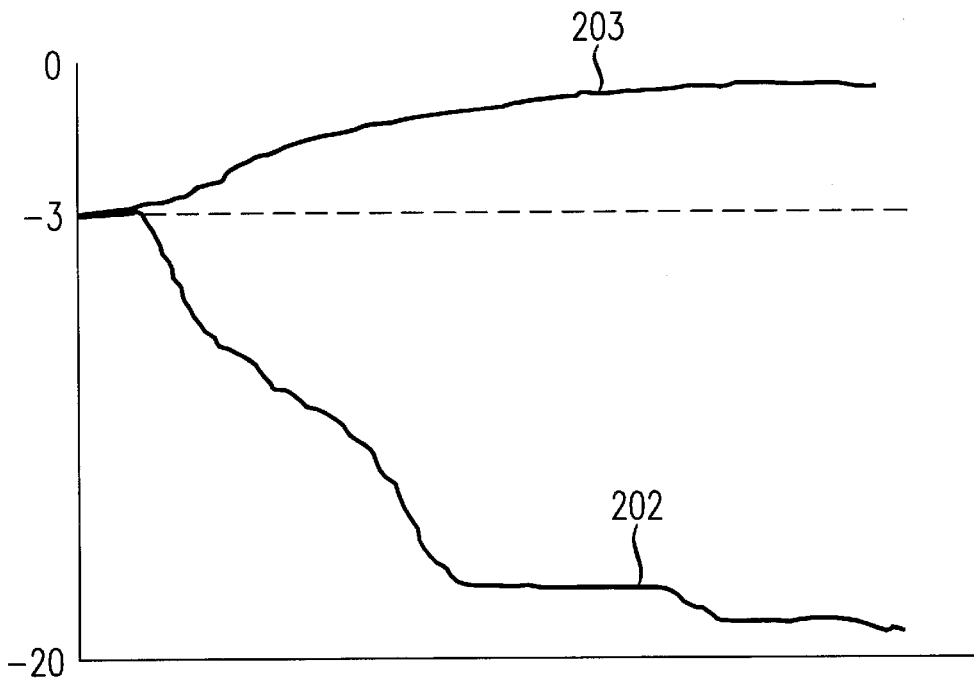
FIG. 2 is a graph of applied voltage versus output power for the Y-branch optical waveguide modulator of FIG. 1.

Refer now to FIG. 2, which describes the operation of the optical modulator 100 of FIG. 1 where the structure has a symmetry about propagational axis b–b' and the refractive index of a waveguide section is to be changed by changing a bias voltage and/or current applied to that waveguide section (e.g., waveguide section 106). FIG. 2 was prepared by feeding an optical signal to be modulated into first waveguide section 102. The index of refraction of waveguide section 104, representing the output of the modulator, is not changed. The output of the modulator 100 is taken at the right-hand end of the third tapered section 123 of second waveguide section 104 (i.e., the end of the third tapered section 123 that is not connected to the second tapered section 122). In this manner, optical energy that is fed into first waveguide section 102 is selectively guided into second waveguide section 104 in relation to the refractive index change of third waveguide section 106.

FIG. 2 is a graph of bias voltage applied to third waveguide section 106 versus output power of the first and second waveguide sections 102, 104. No bias voltage is applied to the second waveguide section 104 (FIG. 1.) Output power is shown on the vertical axis in units of dBm, and applied voltage is shown on the horizontal axis. Output power of the third waveguide section 106 is shown as curve 203, and output power of the second waveguide section 104 is shown as curve 202, which is the modulator output. Note that, when no bias voltage is applied to either waveguide section 104, 106, as is the case at the far left-hand side of the graph, the output power taken from the second waveguide section 104 is 3 dB down from the input power fed to the first waveguide section 102, and the output power taken from the third waveguide section 106 is also 3 dB down from the input power applied to the first waveguide section 102. Under these conditions of bias, the optical modulator 100 (FIG. 1) functions as a power splitter, dividing optical energy fed into first waveguide section 102 substantially equally among second and third waveguide sections 104, 106. As the bias voltage applied to the third waveguide section 106 is changed to increase the refractive index of waveguide section 106, less and less of the power fed into first waveguide section 102 is fed to second waveguide section 104, and more and more of the power fed into first waveguide section 102 is fed to third waveguide section 106, and very little power remains in the output of the modulator, i.e., second waveguide section 104. At relatively high levels of bias, most of the power fed into first waveguide section 102 appears at the output of the third waveguide section 106. This set of conditions represents the "off" state of the modulator.

FIG. 2 only describes the case where the refractive index in waveguide section 106 is raised with respect to the refractive index in waveguide section 104 via electrical bias, and where the refractive index in waveguide section 104 remains essentially unchanged. Substantially chirp-free optical modulation of light can also be achieved in adiabatic Y-branch modulators by decreasing the index (refractive) in one waveguide branch only and using the other waveguide branch as the modulator output. In FIG. 2, at zero bias, the modulator port (waveguide section 104) provides the optical "on" state with an inherent optical attenuation of 50% (3 dB). As the refractive index is increased in waveguide section 106, the optical energy is mostly guided into waveguide section 106 and thereby the optical off state is achieved in waveguide section 104, at least beyond a certain threshold voltage applied to waveguide section 106. This inherent 3dB loss can be overcome by changing to a structure which is asymmetric about propagational axis b–b' where the optical "on" state at zero bias no longer suffers the 50% loss but rather a loss less than 50%. However, the applied voltage needs to be much higher in this case than in the previous case because a larger amount of optical energy at the modulator port (waveguide section 104) needs to become extinguished in the optical "off" state.

If a bias voltage is only applied to the third waveguide section 106, then the third waveguide section 106 experiences a change in its index of refraction which is either higher or lower with respect to waveguide section 104 (but not both) than the index of refraction of the unbiased second waveguide section 104. Under these circumstances, the optical modulator 100 (FIG. 1) provides a high extinction ratio as determined by the amount of refractive index change in the biased arm. Although the modulator 100 exhibits an inherent loss of 3 dB, this loss is acceptable for many, if not all, real-world applications.

We claim:

1. A method of modulating optical energy comprising the steps of:
   (a) applying optical energy to an adiabatic Y-branch digital optical switch having an input branch, a first output branch and a second output branch, wherein the optical energy is applied to the input branch; and
   (b) changing the refractive index of only the first output branch of the switch, with respect to the second output branch, in response to a modulating signal,
   wherein substantially chirp-free modulated optical energy propagates along the second output branch which is not biased and does not experience a substantial refractive index change.

2. A substantially chirp-free optical modulator system comprising:
   (a) an adiabatic Y-branch digital optical switch having an input branch, a first output branch and a second output branch, wherein optical energy is applied to the input branch; and
   (b) an index changing device for changing the refractive index of only the first output branch of the switch in response to a modulating signal,
   wherein modulated optical energy appears at the second output branch; and
   wherein the first output branch and the second output branch are each comprised of tapered waveguide sections.

3. An adiabatic Y-branch optical modulator having an input branch, a first output branch and a second output branch, the input branch adapted to receive optical energy, wherein a modulating signal is applied to induce changes in the refractive index of the first output branch only, such that modulated optical energy is produced at the second output branch of the modulator in response to the modulating signal.

4. The adiabatic Y-branch optical modulator of claim 3 wherein at least one of the first output branch and the second output branch are comprised of one or more tapered waveguide sections.

5. The adiabatic Y-branch optical modulator of claim 3 wherein at least one of the first output branch and the second output branch include a first tapered section having a cross-sectional area that increases with increased distance along the longitudinal axis of the first output branch, thereby providing an optically diverging region in the Y-branch optical modulator.

6. The adiabatic Y-branch optical modulator of claim 5 wherein the first tapered section of the at least one of the first output branch and the second output branch are substantially symmetric about the longitudinal axis of the input branch.

7. The adiabatic Y-branch optical modulator of claim 5 wherein the first tapered section of the at least one of the first output branch and the second output branch are substantially asymmetric about the longitudinal axis of the input branch.

8. The adiabatic Y-branch optical modulator of claim 5 wherein at least one of the first output branch and the second output branch includes a second tapered section having a cross-sectional area that decreases with increased distance along the longitudinal axis of the respective output branch, thereby providing an optically converging region in the Y-branch optical modulator.

9. The adiabatic Y-branch optical modulator of claim 8 wherein the first tapered section is situated between the input branch and the second tapered section.

10. The adiabatic Y-branch optical modulator of claim 8 wherein the second tapered section of at least one of the first output branch and the second output branch and the second tapered section of at least one of the first output branch the second output branch are substantially symmetric about the longitudinal axis of the input branch.

11. The adiabatic Y-branch optical modulator of claim 8 wherein the second tapered section of at least one of the first output branch and the second output branch and the second tapered section of at least one of the first output branch and the second output branch are substantially asymmetric about the longitudinal axis of the input branch.

12. The adiabatic Y-branch optical modulator of claim 8 wherein at least one of the first output branch and the second output branch includes an untapered section having a cross-sectional area that remains substantially constant with increased distance along the longitudinal axis of the respective output branch.

13. The adiabatic Y-branch optical modulator of claim 12 wherein the first output branch and the second output branch each include an untapered section such that the untapered section of the first output branch and the untapered section of the second output branch are substantially symmetric about the propagational axis of the input branch.

14. The adiabatic Y-branch optical modulator of claim 12 wherein the first output branch and the second output branch each include an untapered section such that the untapered section of the first output branch and the untapered section of the second output branch are substantially asymmetric about the propagational axis of the input branch.

15. The adiabatic Y-branch optical modulator of claim 14 wherein the first tapered section is situated between the input branch and the second tapered section.

16. The adiabatic Y-branch optical modulator of claim 14 wherein the second tapered section is situated between the first tapered section and the untapered section.

17. The substantially chirp free optical modulator system of claim 2 wherein the input branch, the first output branch, and the second output branch are fabricated using compounds selected from a Group III-V semiconductor material system.

18. The adiabatic Y-branch optical modulator of claim 3 wherein the input branch, the first output branch, and the second output branch are fabricated using compounds selected from a Group III-V semiconductor material system.

19. The substantially chirp free optical modulator system of claim 2 wherein the input branch, the first output branch, and the second output branch are fabricated using GaAsInP semiconducting material.

20. The adiabatic Y-branch optical modulator of claim 3 wherein the input branch, the first output branch, and the second output branch are fabricated using GaAsInP semiconducting material.

21. The substantially chirp free optical modulator system of claim 19 wherein a cladding layer of InP is applied to the GaAsInP semiconducting material.

22. The adiabatic Y-branch optical modulator of claim 20 wherein a cladding layer of InP is applied to the GaAsInP semiconducting material.

23. The adiabatic Y-branch optical modulator of claim 20 wherein the first and second output branches are both tapered in a manner so as to provide first, second, and third tapered sections, the first output branch having an inner sidewall and an outer sidewall, wherein the distance between the inner sidewall and the second output branch is less than the distance between the outer sidewall and the second output branch, the second output branch having an inner sidewall and an outer sidewall, wherein the distance between the inner sidewall and the first output branch is less than the distance between the outer sidewall and the first output branch, said first, second, and third tapered sections together forming a first outer taper angle $\alpha$, a second outer taper angle $\beta$, and a taper inner angle $\theta$, wherein the first outer taper angle $\alpha$ is defined as the angle between the longitudinal axis of the input branch and the outer sidewall of the first tapered section, wherein second outer taper angle $\beta$ is defined as the angle between the longitudinal axis of the input branch and the outer sidewall of the second tapered section, and taper inner angle $\theta$ is defined as the angle between the longitudinal axis of the input branch and the inner sidewall of the second tapered section.

24. The adiabatic Y-branch optical modulator of claim 23 wherein the first outer taper angle $\alpha$ is selected to be about 0.9 degrees, the second outer taper angle $\beta$ is selected to be about 0.1 degrees, and the taper inner angle $\theta$ is selected to be about 0.35 degrees.

25. The adiabatic Y-branch optical modulator of claim 24 wherein the length of the first tapered section in a direction parallel to the longitudinal axis of the input branch is about 180 micrometers, the length of the second tapered section in a direction parallel to the longitudinal axis of the input branch is about 200 micrometers, and the length of the third tapered section in a direction parallel to the longitudinal axis of the input branch is about 500 micrometers or more.

26. The adiabatic Y-branch optical modulator of claim 25 wherein the first and second output branches are substantially symmetrical about the longitudinal axis of the input branch.

27. The adiabatic Y-branch digital optical modulator of claim 26 wherein the first and second output branches are asymmetric with respect to the longitudinal axis of the input branch.

28. A method of modulating optical energy comprising the steps of:

(a) applying optical energy to an adiabatic Y-branch digital optical switch having an input branch, a tapered first output branch and a tapered second output branch, wherein the optical energy is applied to the input branch; and (b) changing the refractive index of the first output branch of the switch in response to a modulating signal, wherein substantially chirp-free modulated optical energy propagates along the second output branch.

29. The method of claim 28 further comprising the step of configuring the first output branch and the second output branch to each include a first tapered section having a cross-sectional area that increases with increased distance along the longitudinal axis of the respective output branch, thereby providing an optically diverging region in the Y-branch optical modulator.

30. The method of claim 29 further comprising the step of configuring the first output branch and the second output branch to each include a second tapered section having a cross-sectional area that decreases with increased distance along the longitudinal axis of the respective output branch, thereby providing an optically converging region in the Y-branch optical modulator.

31. The method of claim 30 further comprising the step of positioning the first tapered section between the input branch and the second tapered section.

32. The method of claim 31 further comprising the steps of configuring the first tapered section the first output branch and the first tapered section of the second output branch to be substantially symmetric about the longitudinal axis of the input branch, and configuring the second tapered section of the first output branch and the second tapered section of the second output branch to be substantially symmetric about the longitudinal axis of the input branch.

33. The method of claim 30 further comprising the steps configuring the first output branch and the second output branch to each include an untapered section having a cross-sectional area that remains substantially constant with increased distance along the longitudinal axis of the respective output branch.

34. The method of claim 33 further including the step of configuring the untapered section of the first output branch and the untapered section of the second output branch to be substantially symmetric about the propagational axis of the input branch.

35. The method of claim 34 further including the step of positioning the first tapered section between the input branch and the second tapered section.

36. The method of claim 35 further including the step of positioning the second tapered section between the first tapered section and the untapered section.

37. The method of claim 28 further including the steps of fabricating the input branch, the first output branch, and the second output branch using compounds selected from a Group III-V semiconductor material system.

38. The method of claim 1 further including the steps of fabricating the input branch, the first output branch, and the second output branch using compounds selected from a Group III-V semiconductor material system.

39. The method of claim 37 further including the step of fabricating the input branch, the first output branch, and the second output branch using GaAsInP semiconducting material.

40. The method of claim 38 further including the step of fabricating the input branch, the first output branch, and the second output branch using GaAsInP semiconducting material.

41. The method of claim 39 further including the step of applying a cladding layer of InP to the GaAsInP semiconducting material.

42. The method of claim 40 further including the step of applying a cladding layer of InP to the GaAsInP semiconducting material.

43. The method of claim 28 further including the steps of tapering the first and second output branches in a manner so as to provide first, second, and third tapered sections, by configuring the first output branch to have an inner sidewall and an outer sidewall, wherein the distance between the inner sidewall and the second output branch is less than the distance between the outer sidewall and the second output branch, and by configuring the second output branch to have an inner sidewall and an outer sidewall, wherein the distance between the inner sidewall and the first output branch is less than the distance between the outer sidewall and the first output branch, said first, second, and third tapered sections together forming a first outer taper angle $\alpha$, a second outer taper angle $\beta$, and a taper inner angle $\theta$, wherein the first outer taper angle $\alpha$ is defined as the angle between the longitudinal axis of the input branch and the outer sidewall of the first tapered section, wherein second outer taper angle $\beta$ is defined as the angle between the longitudinal axis of the input branch and the outer sidewall of the second tapered section, and taper inner angle $\theta$ is defined as the angle between the longitudinal axis of the input branch and the inner sidewall of the second tapered section.

44. The method of claim 43 further comprising the steps of configuring the first, second, and third tapered sections such that the first outer taper angle $\alpha$ is about 0.9 degrees, the second outer taper angle $\beta$ is about 0.1 degrees, and the taper inner angle $\theta$ is about 0.35 degrees.

45. The method of claim 44 further comprising the steps of configuring the first, second, and third tapered sections such that the length of the first tapered section in a direction parallel to the longitudinal axis of the input branch is about 180 micrometers, the length of the second tapered section in a direction parallel to the longitudinal axis of the input branch is about 200 micrometers, and the length of the third tapered section in a direction parallel to the longitudinal axis of the input branch is about 500 micrometers or more.

46. The method of claim 45 further including the step of configuring the first and second output branches to be substantially symmetrical about the longitudinal axis of the input branch.

47. The method of claim 45 further including the step of configuring the first and second output branches to be asymmetric with respect to the longitudinal axis of the input branch.

* * * * *